United States Patent [19]
Smith et al.

[11] Patent Number: 5,185,529
[45] Date of Patent: Feb. 9, 1993

[54] POSITION ANALYSIS SYSTEM AND METHOD

[75] Inventors: Andrew P. Smith, Medford; Sebastian Genna, Belmont, both of Mass.

[73] Assignee: Digital Scintigraphics, Inc., Waltham, Mass.

[21] Appl. No.: 712,916

[22] Filed: Jun. 7, 1991

[51] Int. Cl.$^5$ .......................... G01T 1/17; G01T 1/164
[52] U.S. Cl. .............................. 250/369; 250/363.07; 250/363.09
[58] Field of Search ............... 250/369, 363.07, 363.09

[56] References Cited
U.S. PATENT DOCUMENTS 4,593,198  6/1986  Pang et al. ........................... 250/366
4,956,796  9/1990  Rogers et al. ....................... 364/581

Primary Examiner—Constantine Hannaher
Attorney, Agent, or Firm—Iandiorio & Dingman

[57] ABSTRACT

A position analysis system and method for determining the position of an event sensed by one or more detectors includes detector means having at least one detector for detecting an emission from an event; means, responsive to the detector means, for generating a number of different functions from the outputs of one or more detectors; means for determining the estimated position of the event and the reliability of that estimation from each of the functions; and means for combining all of the estimated positions and all of the reliabilities of those estimated positions to define the best estimate of the position of the event.

7 Claims, 4 Drawing Sheets

POSITION ANALYSIS SYSTEM AND METHOD

FIELD OF INVENTION

This invention relates to a position analysis system and method, and more particularly to such a method and system for use in a radionuclide camera to determine the position of an event such as an emission from a radioactive source.

BACKGROUND OF INVENTION

The basic functioning of a gamma camera is to "image" the distribution of radioactivity impinging on a detector. This may be used to estimate the distribution of sources emitting the radioactivity. The imaging consists of collecting the histogram, as a function of position, of the locations of where successive radioactive particles strike the detector.

A simplified gamma camera configuration consists of a scintillation detector, such as of sodium iodide, which converts radioactivity into visible light, and a group of photosensitive detectors, such as photomultipliers, which convert the visible light into electrical signals. The process of imaging is one where, for each scintillation event, the most likely position of scintillation is determined from the distribution of light detected by the array of photodetectors. It should be noted that the resolution of position is not limited to the size of the photodetectors. In other words, an algorithmic combination of photodetector signals is used to determine scintillation position with accuracies finer than the discrete sizes of the photodetectors.

A common algorithm for determining the event location from the distribution of photodetector signals is the centroid equation. Its one-dimensional form for the position $<x>$ of a scintillation event is: $<x> = \Sigma(q_i * x_i)/\Sigma q_i$, where $q_i$ is the signal on the $i^{th}$ photodetector, which is located at position $x_i$, and the sum runs over all detectors.

The centroid equation has problems which limit its accuracy. Some of these problems are theoretical, namely non-linearity and noise.

With respect to non-linearity, the position determination $<x>$ is not exactly equal to the correct position of the scintillation event. The error in $<x>$ can be measured, however, and linearity correction look-up tables can be employed to improve its accuracy.

With respect to poor noise performance, photodetectors far from the scintillation event have little signal, but these small signals, with their inevitable noise, are added into the centroid equation with large coefficients, which essentially amplifies their noise contribution. This can be addressed by limiting the number of terms calculated for each scintillation event.

Some are due to practical implementation (energy and spatial dependence): in a standard, state-of-the-art gamma camera, the centroid algorithm is implemented using analog electronics. One of the theoretical disadvantages of the equation is its noise performance. It is for this reason that the standard analog implementation differs from the theoretical centroid equation. To reduce the effect of noise from distant photodetectors, the equation is currently implemented with a cutoff parameter. What this means is that only photodetectors having a signal greater than a predefined threshold are allowed to contribute to the centroid equation. If this cutoff is implemented as a simple number, i.e. includes all signals greater than 1.2 volts, then another problem arises with the equation: its position determination is not energy-independent. Thus the linearity correction tables will not be valid for all energies.

For example, if the energy of the radiation is doubled, then the distribution of signals $q_i$ will become $q_i \rightarrow 2*q_i$, and the resultant $<x>$ will be different, as more $q_i$ will now be larger than the cutoff. If the cutoff used is a ratio, normalized to the total energy, then this problem is eliminated, but this is difficult to implement in analog electronics.

Another problem with the analog solution is the intermingling of several equations at the same location, and the subsequent linearity calibration. Successive events at the same location on the detector will not always give the same signals in the photodetectors. They will vary statistically as Poisson variables. This means that different events at the same detector location will have their locations determined using the centroid equation with a different number of terms. The linearity correction term measured for events at this location will be the algebraic average of the errors resulting from the position determination using several algorithms. This is a less accurate correction method than correcting each specific algorithm individually. A further understanding can be obtained from U.S. Pat. Nos. 4,095,107, 4,228,515, 4,584,478, 4,593,198, 4,782,233, 4,831,261, 4,837,439, and 4,859,852, which are incorporated herein by reference.

SUMMARY OF INVENTION

It is therefore an object of this invention to provide an improved position analysis system and method for delivering the position of an event.

It is a further object of this invention to provide such a system and method for use with a radionuclide camera.

It is a further object of this invention to provide such a system and method which minimize image distortion due to variations in the energy sensed.

It is a further object of this invention to provide such a system and method which optimize resolution independent of the location of the event relative to the sensitive areas of the detectors.

It is a further object of this invention to provide such a system and method which are more accurate and reliable in estimating the event position.

It is a further object of this invention to provide such a system and method which employ a number of different estimations to determine the position of an event.

It is a further object of this invention to provide such a system and method which more simply, quickly and reliably determine the position of a sensed event.

The invention results from the realization that more effective position analysis can be achieved by generating a plurality of estimation functions from one or more detectors in response to a single event and combining the estimated positions and the reliability factors associated with each of these positions to reach a best estimate of the event position.

This invention features a position analysis system for determining the position of an event sensed by one or more event detectors. There are detector means including at least one detector for detecting an emission from an event. Means responsive to the detector means generates a number of different functions from the outputs of the one or more detectors. There are means for determining the estimated position of the event and the reliability of that estimation from each of the functions, and there are means for combining all of the estimated positions and all the reliabilities of those estimated positions to define the best estimate of the position of the event.

In a preferred embodiment the detector means may include a plurality of detectors and each detector may be a photomultiplier device. Each photomultiplier device may produce an analog output and the detector means may include an analog to digital converter means for converting the analog output to a digital signal. Each of the functions may respond to the outputs of more than one of the detectors. The means for determining may include a look-up table of adjusted position and reliability values. The means for combining may include means for summing all of the estimated reliabilities and all of the products of the estimated reliabilities and their associated estimated positions, and normalizing the latter with the former. The detector means may include means for determining the one of the detectors having the highest output and the means for generating may include means for selecting the output of the detector having the highest output and the output of at least one other detector.

The invention also features a position analysis system for determining the position of an event sensed by a plurality of detectors which has a detector means including a plurality of detectors for simultaneously detecting emissions from an event and providing analog outputs representative of the position of the event. Means responsive to the output from a number of different detectors generates a plurality of different functions. There are means for determining the estimated position of the event and the reliability of that estimation from each function, and means for combining all of the estimated positions and all of the reliability of those estimated positions to define the best estimate of the position of the event.

In a preferred embodiment, the detector means includes analog to digital converter means for converting the analog output to a digital signal. The means for generating may respond to a different set of detectors to generate a function for each of the sets. Each set may include at least one detector. The means for determining may include a look-up table associated with each function and the means for combining may include means for summing all the estimated reliabilities and all the products of the estimated reliabilities and their associated estimated positions and normalizing the latter with the former.

The invention also features a radionuclide camera system including a scintillation detector means for sensing radiation emitted from a radioactive source. There are a plurality of photodetectors responsive to the scintillation detector means for providing analog outputs representative of the position of the radioactive source. Means responsive to the output from a number of different photodetectors generates a plurality of different functions. There are means for determining the estimated position of the source and the reliability of the estimation from each of the functions, and there are means for combining all of the estimated positions and all of the reliabilities of those estimated positions to define the best estimate for the position of the source. The detector means may include analog to digital converter means for converting the analog output to a digital signal. The means for generating may respond to a number of different sets of photodetectors and generate a function for each of the sets. Each set may include at least one photodetector and the means for determining may include a look-up table associated with each function, and the means for combining may include means for summing all of the estimated reliabilities and all of the products of the estimated reliabilities and their associated estimated positions, and normalizing the latter with the former.

The invention also features a position analysis method for detecting the position of an event comprising detecting at one or more locations an emission from an event; generating a number of different functions from those detections; determining the estimated position of the event and the reliability of the estimation from each function; and combining all the estimated positions and all the reliabilities of those estimated positions to define the best estimate of the position of the event.

DISCLOSURE OF PREFERRED EMBODIMENT

Other objects, features and advantages will occur to those skilled in the art from the following description of a preferred embodiment and the accompanying drawings, in which.

Figure 3A:
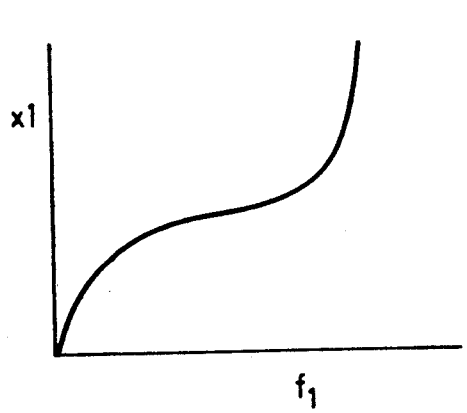
Figure 2:
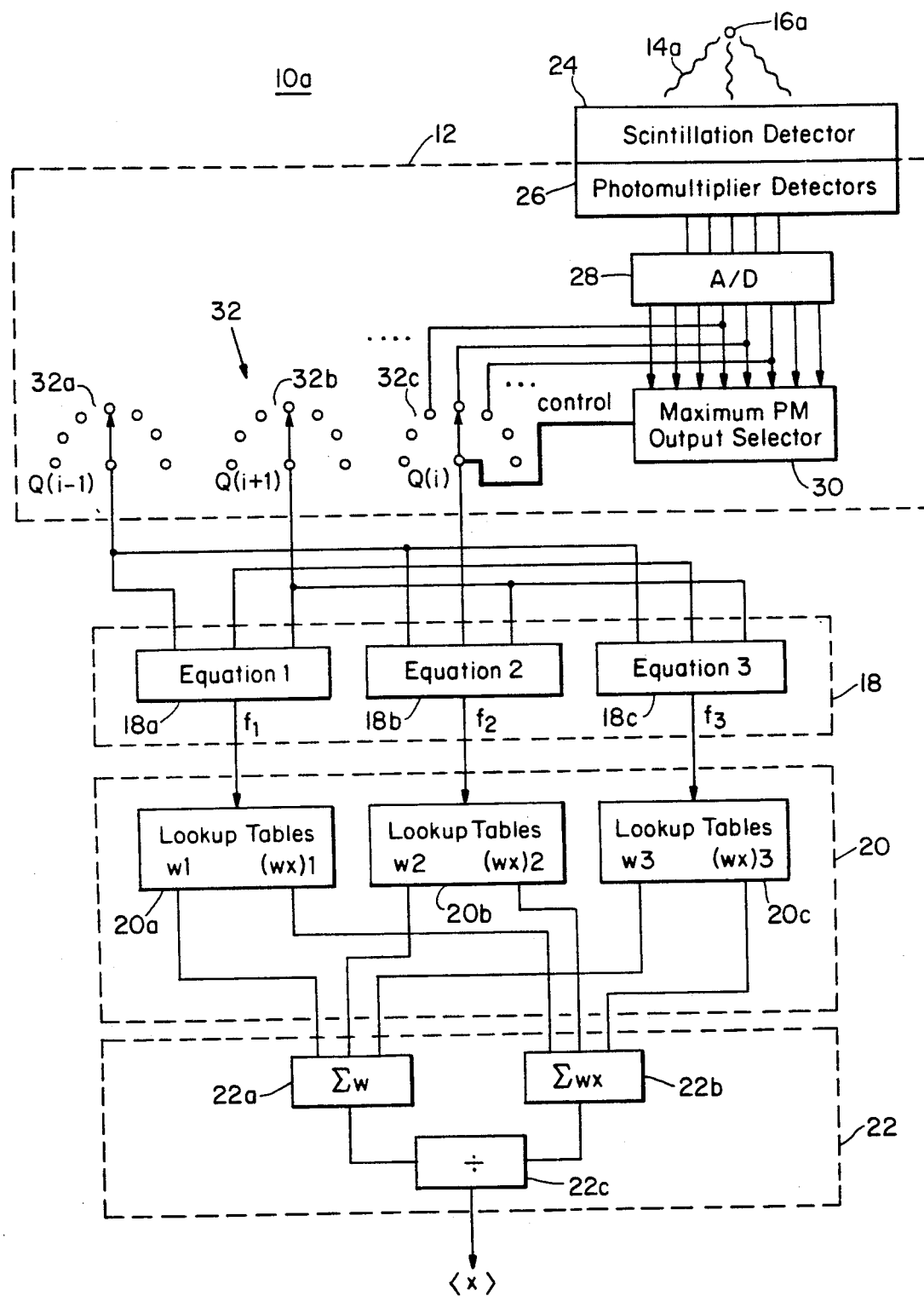
FIG. 2 is a more detailed block diagram of a position analysis system according to this invention utilized with a radionuclide scintillation camera.
Figure 4:
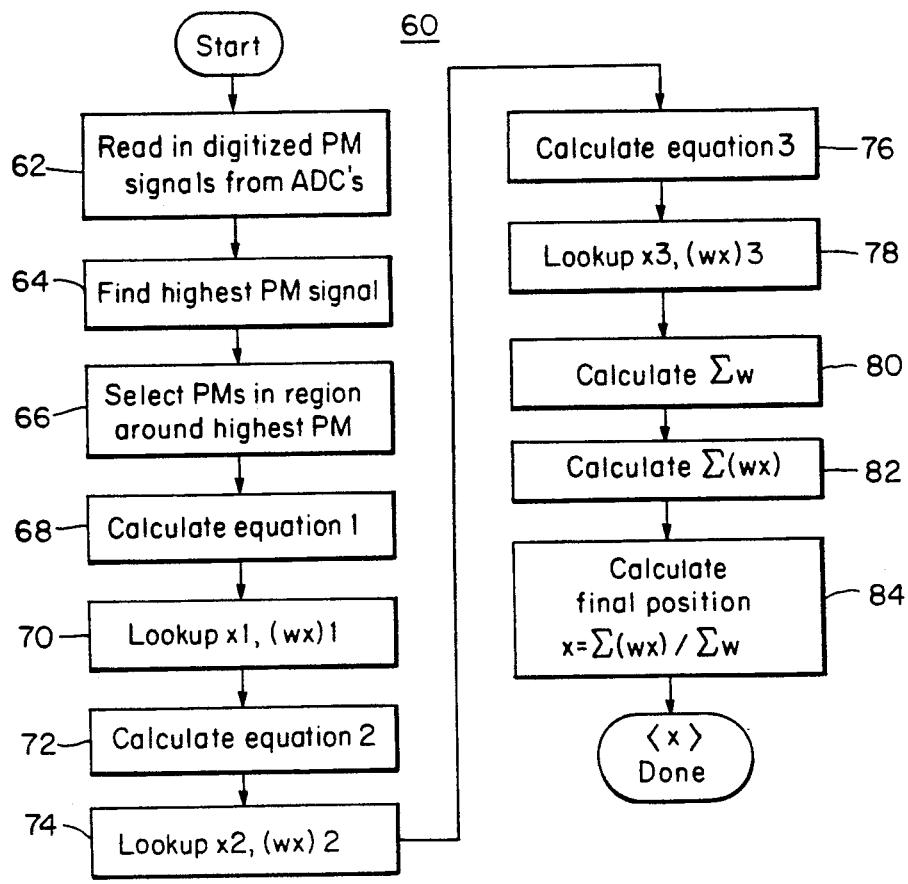
Figure 6:
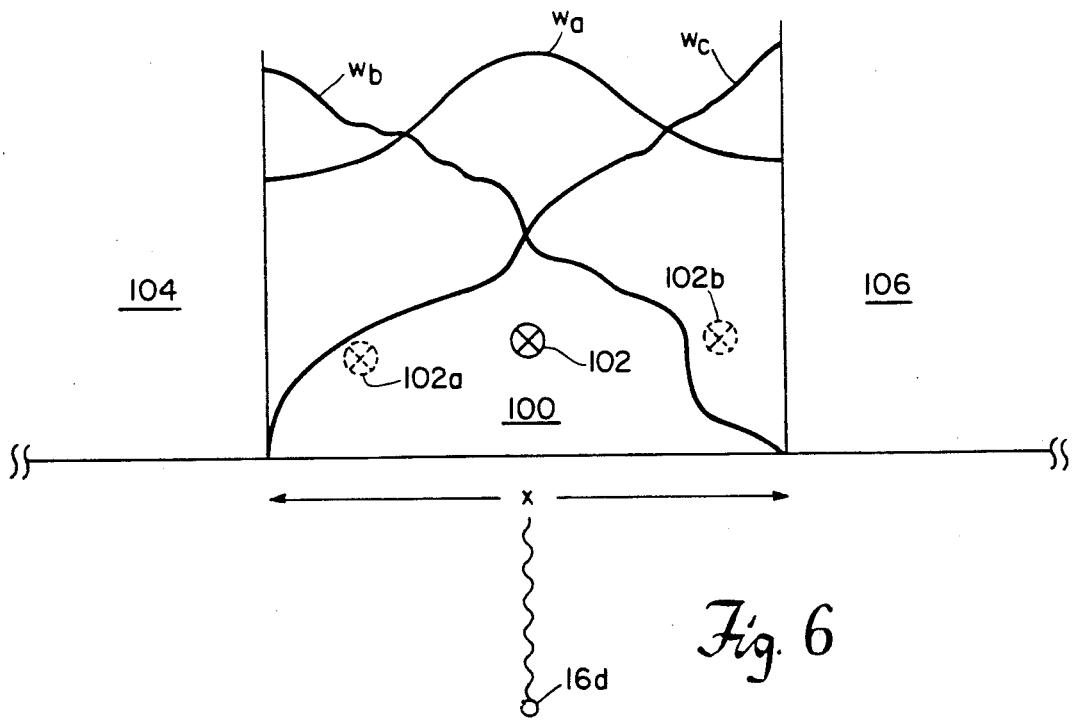
Figure 5:
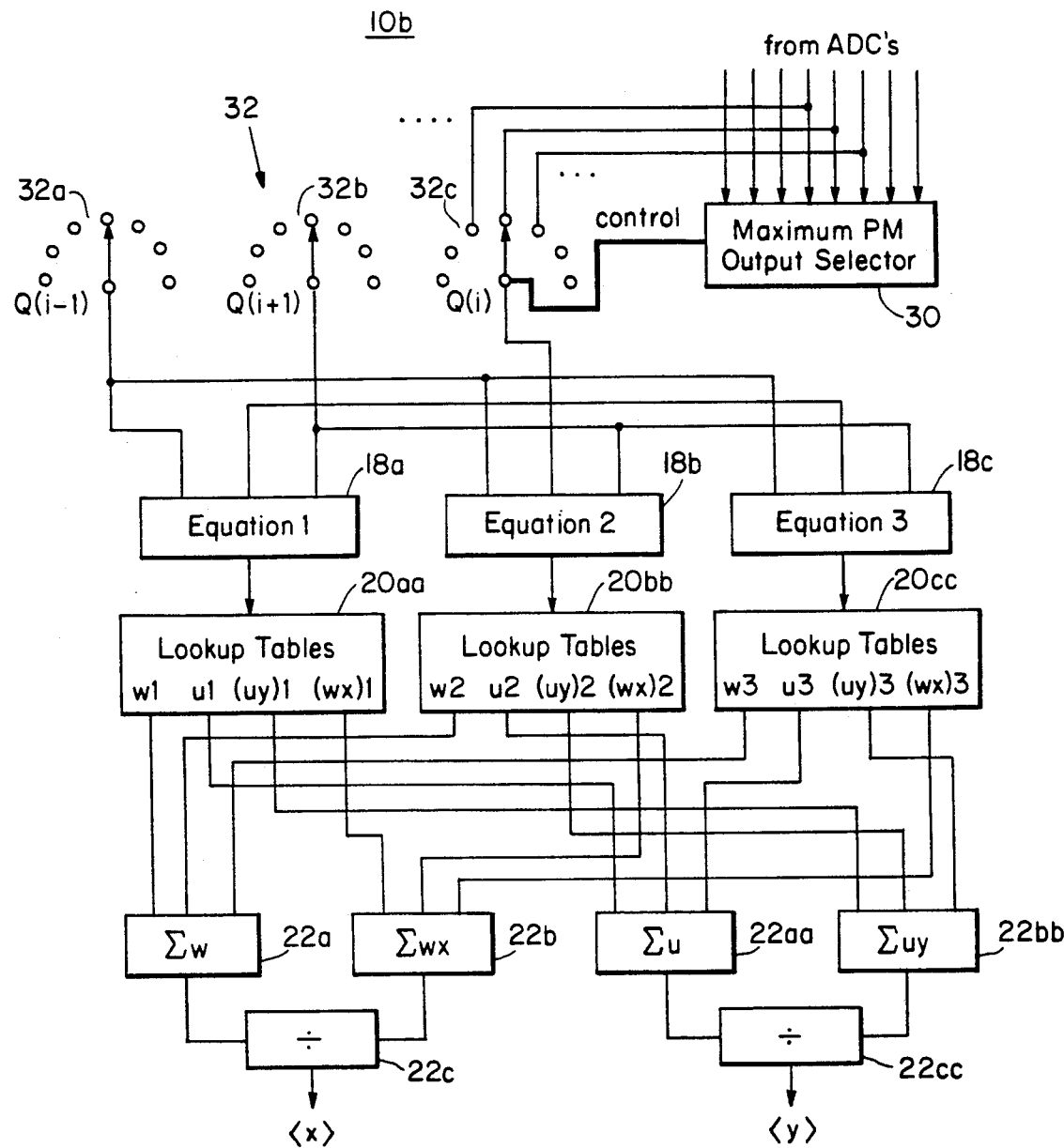

FIGS. 3A and B illustrate the table look-up functions for the look-up tables in FIG. 2;

FIG. 4 is a flow chart for a software implementation of the position analysis according to this invention;

FIG. 5 is a detailed block diagram similar to that shown in FIG. 2 for a multidimensional implementation of the position analysis system of this invention; and FIG. 6 is an illustration of the effects of using more than one weighting function to estimate the position of a single event.

Figure 1:
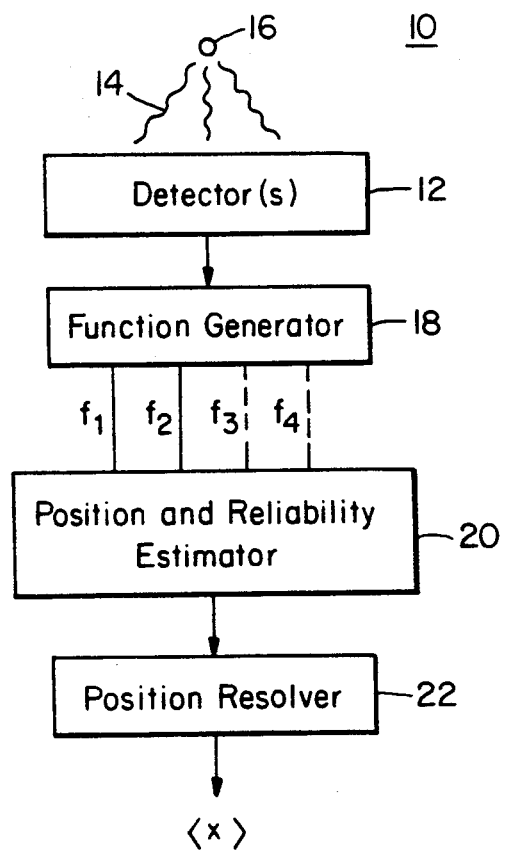
FIG. 1 is a block diagram of a position analysis system according to this invention.

There is shown in FIG. 1 a position analysis system 10 according to this invention including one or more detectors 12 which respond to the emission 14 from an event 16. The output from one or more of the detectors 12 are submitted to function generator 18 which generates a plurality of different functions $f_1, f_2, \ldots$ From these functions the position and the reliability are estimated in position and reliability estimator 20, whose output is submitted to a position resolver 22 to determine the final position $<x>$ to finally determine the best estimated position of event 16.

Typically detector 12 includes a plurality of detectors, each one of which is, for example, a photomultiplier device and each one of which produces an analog output. The detector typically also includes an analog to digital converter for converting the analog output to a digital signal. Each of the functions generated in function generator 18 is derived from the outputs from one or more detectors 12. The position and reliability estimator 20 is typically implemented with a look-up table which provides an adjusted position and reliability value for each of the functions delivered by function generator 18. Position resolver 22 combines all of the estimated reliabilities and all of the products of the estimated reliabilities and their associated estimated positions, and normalizes the latter with the former to obtain the final position $<x>$. Typically sets of detectors, each set including one or more detectors, are used as a basis of deriving each of the functions $f_1, f_2, \ldots$ The sets may be determined by selecting the detector that has the highest output for a particular event and then selecting along with it one or more associated detectors such as the neighboring ones on either side, or the one diametrically opposed, or matching any other criteria that are desirable for a particular application.

Position analysis system 10a, FIG. 2, may be employed in a radionuclide camera having a scintillation detector 24 which senses radioactive emissions 14a from a radioactive source or target 16a. Photomultiplier detectors 26 convert the light output from scintillation detector 24 to analog signals which are submitted to A/D converter 28. The output from A/D converter 28 is submitted to maximum photomultiplier output selector 30 which selects the photomultiplier that has the highest output with respect to a particular event.

A/D converter 28 may be a single A/D converter, multiplexed, or may be a plurality of A/D converters, one associated with each detector. A set selector circuit 32 employs a number of switches 32a, 32b, 32c to direct the output q(i) from the detector having the greatest output along with the two adjacent photomultipliers q(i−1) and q(i+1) Actually, switching circuit 32 may be implemented by semiconductor means and may have a much greater variety of choices available to it so that photomultipliers in any relation to the one with the highest output could be chosen in various combinations. It can also be implemented by software means. The outputs from switching devices 32a, 32b, 32c are fed to function generator 18 which includes a plurality of circuits 18a, 18b, 18c that use the digitized outputs from switches 32a, 32b, 32c to calculate different functions from the sets of photomultipliers. For example, circuit 18a solves the equation:

$$x = (qi^* x i + qi - 1^* x i - 1)/(qi + q i - 1) \quad (1)$$

Circuit 18b solves the equation:

$$x = (qi - 1^* x i - 1 + qi^* x i + qi + 1^* x i + 1)/(qi - 1 + qi + qi + 1) \quad (2)$$

Circuit 18c solves the equation:

$$x = (qi^* x i + qi + 1^* x i + 1)/(qi + qi + 1) \quad (3)$$

The function thus generated by each of circuits 18a, 18b and 18c is then submitted to the position reliability estimator 20 which includes a plurality of look-up tables 20a, 20b, 20c. Each of the look-up tables has provision for applying the function at the output of the related circuit 18a, 18b, 18c to find the reliability factor $w_1$, $w_2$, $w_3$, and the product of the reliability factor and the position $wx_1$, $wx_2$, $wx_3$, all respectively. All of the reliability outputs $w_1$, $w_2$ and $w_3$ are combined in summer circuit 22a, while all the products $wx_1$, $wx_2$ and $wx_3$, are combined in summer 22b. The output from 22b is normalized or averaged by being divided in divider 22c by the output for 22a to obtain the final best estimate $<x>$ of the position of the scintillation event 16a.

Figure 3B:
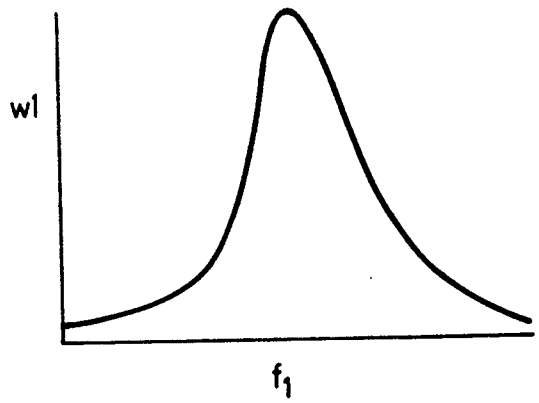

The look-up tables implemented in look-up table circuit 20a are illustrated in FIGS. 3A and 3B. FIG. 3A provides the values of $x_1$ in response to function $f_1$ and in FIG. 3B the value of $w_1$ is provided for values of $f_1$; look-up tables 20a, 20b and 20c each include multiplier means for multiplying the values of $x_1$ and $w_1$ to obtain the necessary outputs to summing circuit 22b. Function generator 18 includes a plurality of circuits 18a–c so that the position of each event and its reliability is estimated according to a different algorithm. This is so whether the input to circuits 18a–c is from a single detector or from two or more detectors. That is, the number of functions generated is independent of the number of detector inputs selected. Similar illustrations apply for $x_2$ and $x_3$ and $w_2$ and $w_3$.

An important feature of the invention is that more than one function is used to generate the estimated position. The problem with using only one function or algorithm is that there is not one algorithm which gives good performance for all positions of an event. Attempts to use a number of different algorithms separately, according to their specific regions of validity, results in difficulties at the junctions between the regions covered by these algorithms. By generating a number of algorithms or functions simultaneously for the same event, the reliability of the position estimate is improved because even the apparently less applicable algorithms are relied upon to some extent. Also, the use of reliability functions allows for smooth transitions between the region of the algorithms.

Software for implementation of the position analysis operates in accordance with flow chart 60, FIG. 4. This software can be used with a dedicated processor, or with a standard computer such as an IBM personal computer. Initially, in step 62, the digitized photomultiplier signals from the A/D converters are read in. The highest photomultiplier signal is determined in step 64, and that photomultiplier plus any related photomultipliers are chosen in step 66 as required by the particular function. Equation (1) is then calculated in step 68, after which the w1 and wx1 look-up occurs in step 70. Equation (2) is calculated in step 72, and the look-up for x2 and wx2 is performed in step 74. Finally, equation (3) is calculated in step 76 and the look-up is accomplished for x3 and (wx)3 in step 78. Summation of all the w's is performed in step 80, and the summation of all of the (wx)'s in step 82, after which the summation of (wx) is divided by the summation of the w's in step 84 to obtain the final estimated position x.

Although thus far the system has been explained in one dimension only, it may be employed in multidimensional applications, as shown in FIG. 5, where like parts have been given like numbers. In FIG. 5, system 10b includes two-dimensional look-up tables 20aa, 20bb and 20cc, each of which has two sets of look-up values w1, w=(wx)1, and u1, (uy)1, and two sets of look-up values u and x. Thus look-up table 20aa has w1 and (wx)1, u1, and (uy)1; look-up table 20bb has w2, (wx)2, as well as u2 and (uy)2; and look-up table 20cc has w3, (wx)3, u3 and (uy)3. The w outputs are submitted to circuits 22a and b as previously, whereas the u outputs are delivered to circuits 22aa and 22bb.

The efficacy of using more than one weighted function to estimate the position of an event as detected by a photodetector is shown in FIG. 6, where photodetector 100 is the photodetector which has sensed the event at the region of the photodetector marked 102. There are other photodetectors 104, 106 on either side of photodetector 100. Superimposed on the schematic of photodetector 100 are three weighting functions $w_a$, $w_b$ and $w_c$, which are associated with the three different functions. If one were to use a single weighted function, for example $W_a$, it can be seen that the reliability or certainty of the estimation would be very high since $w_a$ peaks in the midregion of photodetector 100 where the impingement 102 occurred. However, one never knows where the strike is going to be, and if for example it was at spot 102a or 102b then the reliability, having chosen weighting function $w_a$, would be substantially poorer. The same holds true had one chosen the weighting $w_b$ or $w_c$: $w_b$ would have given good results for 102a but poor results for 102, and even poorer results for 102b, and conversely, with weighting $w_c$. Thus a predetermined choice of which function to use has its shortcomings. But there are also shortcomings in having available a number of functions but choosing only one at a time on the basis of the preliminary estimation of where the strike is. Thus if one can determine the probability is high that the strike occurred at 102b, one might choose $w_c$ as the weighting, but then there is no continuity from one determination to the next. In accordance with this invention, a number of different functions are generated and weighted simultaneously for each event. Thus even though the certainty is very low with respect to $w_b$ and $w_c$ for a strike at spot 102, there is some information in the level of certainty established by them. Thus the mere decision that a weighting function is less applicable than some other weighting function does not require that the value and information in that function be ignored. Rather, it will be included in the overall estimation process but to a lesser weighted degree than the more likely weighting function. In this manner all of the information is utilized and the accuracy is improved.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A position analysis system for determining the position of an event sensed by one or more event detectors, comprising:
   detector means including at least one detector for detecting an emission from an event;
   means, responsive to said detector means, for generating a number of different functions from the outputs of the one or more detectors;
   means for determining the estimated position of the event and the reliability of that estimation from each said function; and
   means for summing all of the estimated reliabilities and all of the products of the estimated reliabilities and their associated estimated positions and normalizing the latter with the former.

2. A position analysis system for determining the position of an event sensed by a plurality of detectors, comprising:
   detector means including a plurality of detectors simultaneously detecting emissions from an event and providing analog outputs representative of the position of the event;
   means, responsive to the outputs from a number of different detectors, for generating a plurality of different functions; said means for generating being responsive to a number of different sets of detectors and generating a function for each of said sets;
   means for determining the estimated position of the event and the reliability of that estimation from each said function; and
   means for combining all of the estimated positions and all of the reliabilities of those estimated positions to define the best estimate of the position of the event.

3. The position analysis system of claim 2 in which each said set includes at least one detector.

4. A position analysis system for determining the position of an event sensed by a plurality of detectors, comprising:
   detector means including a plurality of detectors simultaneously detecting emissions from an event and providing analog outputs representative of the position of the event;
   means, responsive to the outputs from a number of different detectors, for generating a plurality of different functions;
   means for determining the estimated position of the event and the reliability of that estimation from each said function; and
   means for summing all of the estimated reliabilities and all of the products of the estimated reliabilities and their associated estimated positions and normalizing the latter with the former.

5. A radionuclide camera system comprising:
   a scintillation detector means for sensing radiation emitted from a radioactive source;
   a plurality of photodetectors responsive to said scintillation detector means for providing analog outputs representative of the position of the radioactive source;
   means, responsive to the outputs from a number of different photodetectors, for generating a plurality of different functions; said means for generating being responsive to a number of different sets of photodetectors and generating a function for each of said sets;
   means for determining the estimated position of the source and reliability of that estimation from each said function ;and
   means for combining all of the estimated positions and all of the reliabilities of those estimated positions to define the best estimate of the position of the source.

6. The position analysis system of claim 5 in which each said set includes at least one photodetector.

7. A radionuclide camera system comprising:
   a scintillation detector means for sensing radiation emitted from a radioactive camera;
   a plurality of photodetectors responsive to said scintillation detector means for providing analog outputs representative of the position of the radioactive source;
   means, responsive to the outputs from a number of different photodetectors, for generating a plurality of different functions;
   means for determining the estimated position of the source and the reliability of that estimation from each said function; and
   means for summing all of the estimated reliabilities and all of the producers of the estimated reliabilities and their associated estimated positions and normalizing the latter with the former.

* * * * *